United States Patent [19]
Zaguroli, Jr.

[11] Patent Number: 5,644,821
[45] Date of Patent: Jul. 8, 1997

[54] ARRANGEMENT FOR ATTACHMENT OF A STOP ELEMENT TO A HOIST CABLE OR CHAIN

[75] Inventor: James Zaguroli, Jr., Drayton Plains, Mich.

[73] Assignee: Knight Industries, Inc., Auburn Hills, Mich.

[21] Appl. No.: 478,787

[22] Filed: Jun. 7, 1995

[51] Int. Cl.⁶ ................................................ F16G 11/00
[52] U.S. Cl. .................. 24/114.5; 24/115 H; 24/115 F; 24/129 A
[58] Field of Search ................ 24/115 H, 115 F, 24/114.5, 129 A

[56] References Cited

U.S. PATENT DOCUMENTS

| | | | |
|---|---|---|---|
| 418,995 | 1/1890 | Tufts | 24/114.5 |
| 534,946 | 2/1895 | Bates | 24/115 H |
| 601,930 | 4/1898 | Bell | 24/129 A |
| 2,581,366 | 1/1952 | De Grazia | 24/115 H |
| 2,592,696 | 4/1952 | Hoody | 24/115 F |
| 2,877,527 | 3/1959 | Bond | 24/115 H |
| 3,830,425 | 8/1974 | Stallmann | 24/259 X |
| 3,897,161 | 7/1975 | Reinwall, Jr. | 24/134 Q X |
| 3,938,122 | 2/1976 | Mangus | 340/275 |
| 4,049,357 | 9/1977 | Hamisch, Jr. | 24/115 X |
| 4,319,428 | 3/1982 | Fox | 24/115 H |
| 5,345,656 | 9/1994 | Merritt | 24/115 H |

*Primary Examiner*—Peter M. Cuomo
*Assistant Examiner*—Stephen Vu
*Attorney, Agent, or Firm*—John R. Benefiel

[57] ABSTRACT

A molded plastic ball stop element is adapted to be clamped to a cable or a chain particularly for an air balancing hoist, the ball formed in two pieces fastened together with flat faces in abutment. Pairs of grooved removable steel inserts grip a cable, while additional grooves form pockets configured to positively engage chain links when the inserts are removed.

9 Claims, 2 Drawing Sheets

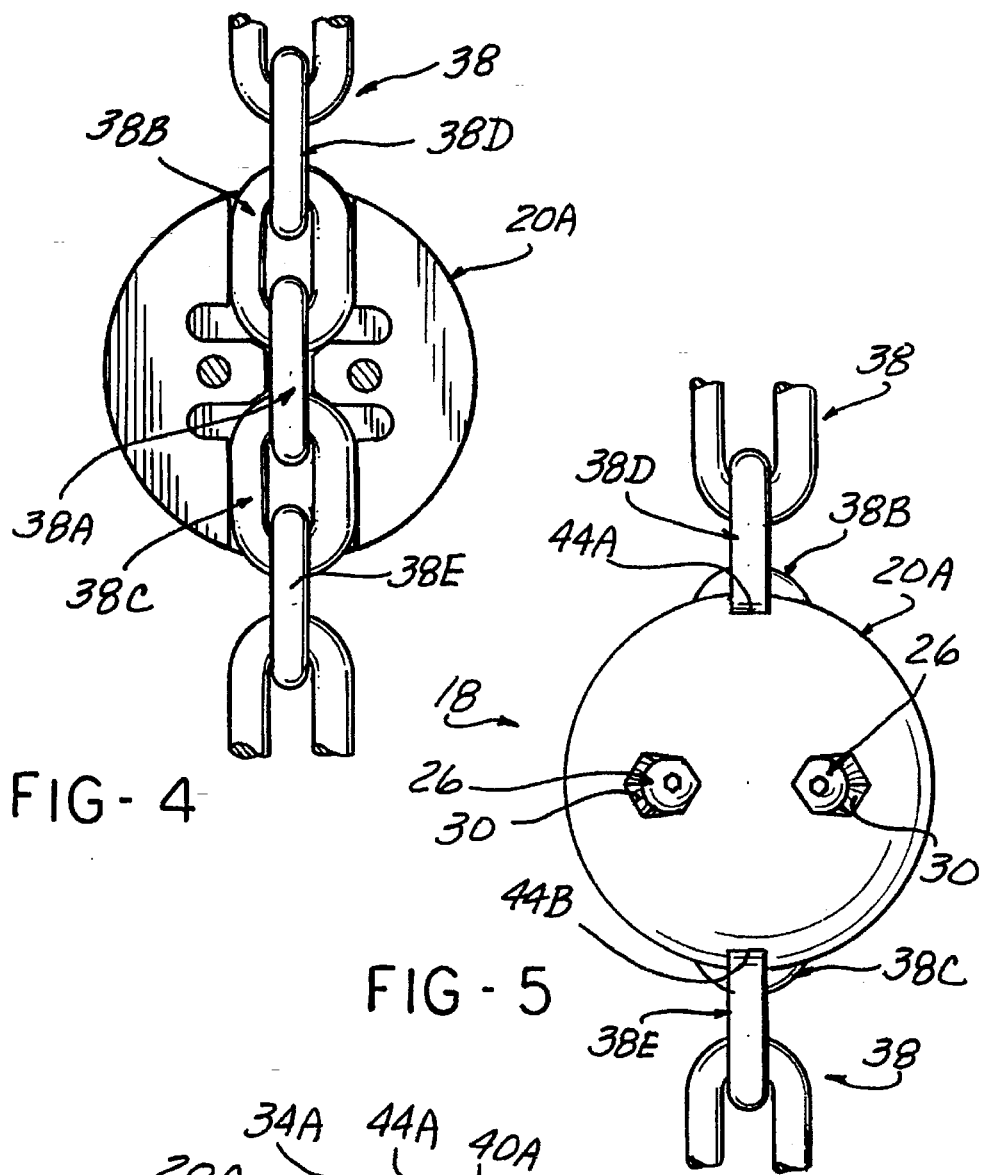
FIG-4
FIG-5
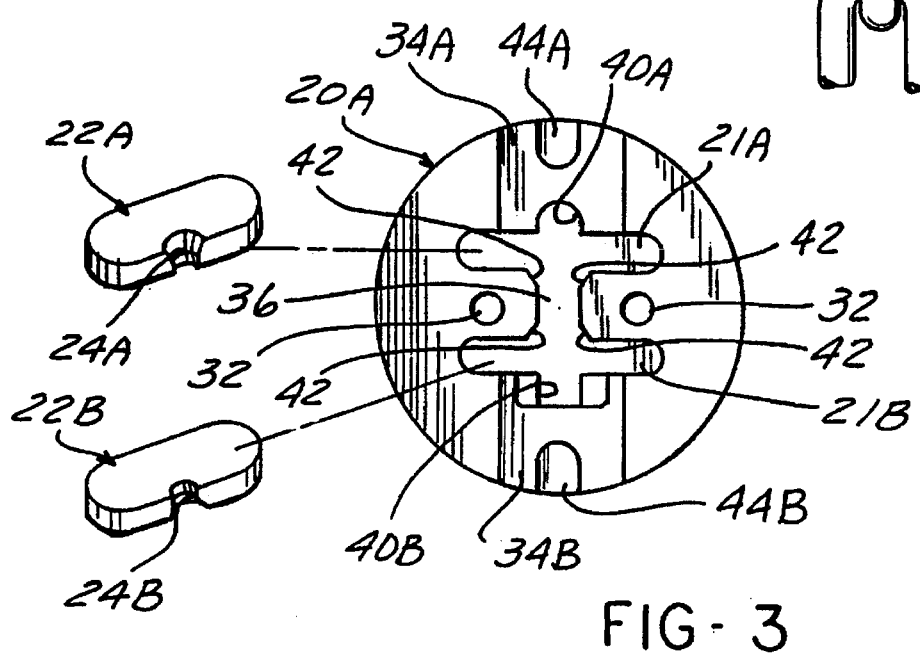
FIG-3

ARRANGEMENT FOR ATTACHMENT OF A STOP ELEMENT TO A HOIST CABLE OR CHAIN

BACKGROUND OF THE INVENTION

The present invention concerns cable and chain stops used to prevent a cable or chain from being advanced into a hoist housing when the wind up drum is suddenly stopped at its highest point. The cable or chain can possibly become tangled as the cable or chain can jump off the wind up drum. This is a particular problem with air balancing hoists which operate at high speeds.

A stop element often used is a plastic ball having a hole through which the hoist cable passes. A crimped cable fitting limits the extent to which the cable can be advanced into the hoist housing, the stop ball being pressed against the perimeter of the opening.

The need to crimp a fitting to the cable is inconvenient as it requires special crimping equipment, which may not be available at the location of the hoist.

In addition, a stop is also sometimes needed for a hoist using chain, and conventional stop balls have not heretofore been conveniently attachable to chain.

Accordingly, it is an object of the present invention to provide a simple means of attachment of a stop element to either a cable or chain which does not require special crimping.

SUMMARY OF THE INVENTION

The above object is achieved by molding the stop ball from hard plastic in separate hemispherical pieces which can be assembled to form a ball and held together by screws. A pair of steel inserts with aligned clamping grooves are fit in recesses in each of the ball pieces, which insert grooves engage the cable as the screws are tightened to establish a secure clamping engagement.

For fixing the stop ball to chain, the inserts are removed, leaving a cavity configured to be positively fit to links of the hoist chain when the stop ball pieces are assembled together.

DESCRIPTION OF THE DRAWINGS

FIG. 3 is an exploded side view of one of the stop ball pieces with the cable clamp inserts removed to ready the ball for being fit to a hoist chain.

FIG. 4 is a side view of the ball half shown in FIG. 3 with a segment of chain fit into groove recesses therein.

FIG. 5 is a side view shown of a stop ball with both pieces assembled to be secured to hoist chain.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
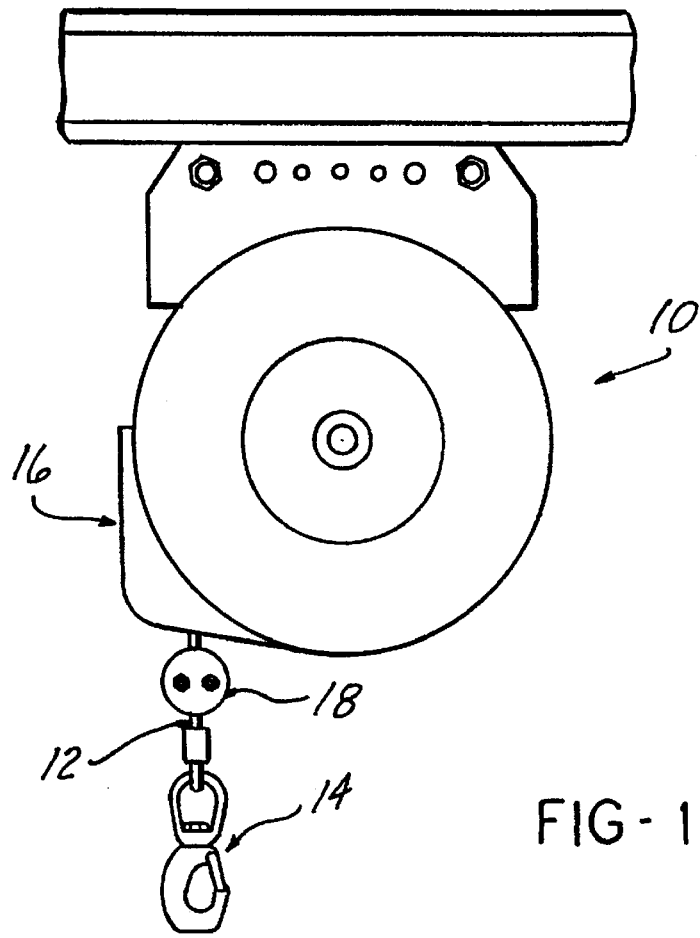
FIG. 1 is a side elevational view of a cable hoist having stop ball attached by the arrangement according to the present invention.
Figure 2:
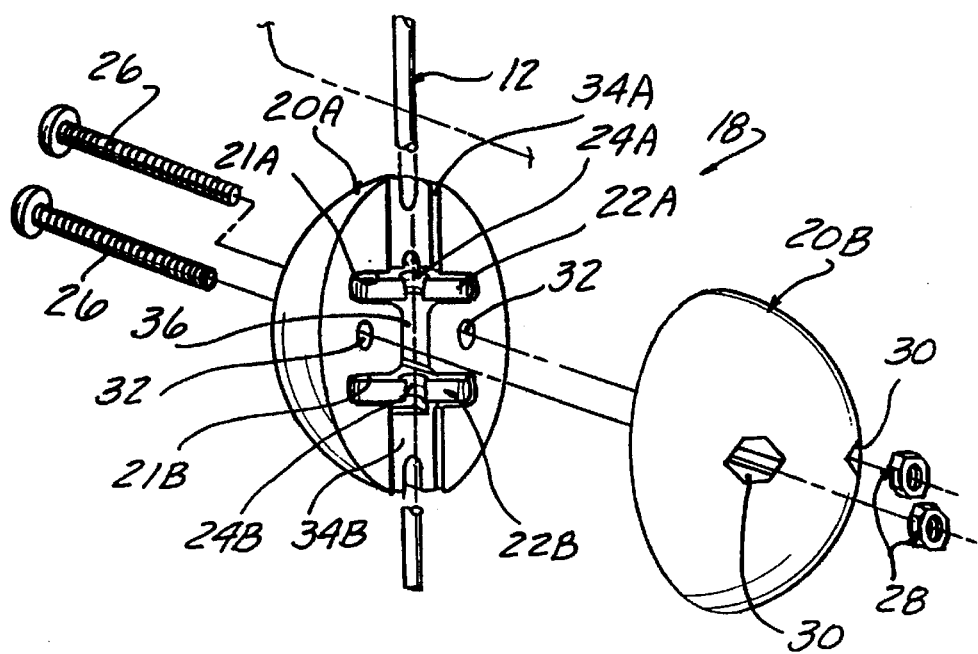
FIG. 2 is an enlarged exploded perspective view of the components of the stop ball shown in FIG. 1, showing fragmentary portions of the hoist cable.

Referring to the drawings, and more particularly FIGS. 1 and 2, an air balancing hoist 10 is shown, which has a wind up drum (not shown) which winds up and pays out a length of cable 12, having a lifting hook 14 attached at its free end. The cable 12 passes through an opening in housing 16, within which is contained the wind up drum. In order to limit the extent of overshooting movement of the cable 12 into the housing 16 when the wind up is suddenly stopped and to prevent unwinding of the cable from the drum, a stop ball 18 is securely clamped to the cable 12 by the arrangement according to the present invention, which does not use separate crimped elements.

The stop ball 18 is assembled from separate identical hemispherical pieces 20A, 20B molded from a suitable high strength plastic.

Each ball piece 20A, 20B has a spaced apart pair of parallel transverse recesses 21A, 21B extending transversely to the cable axis, in which are seated a spaced set of hard metal (steel) clamping inserts 22A, 22B, each formed with a tapering cross groove 24A, 24B aligned with each other on the cable axis. The inserts 22A, 22B are seated to be flush with the abutting faces of each ball piece 20A, 20B. The cross grooves 24A, 24B are sized to securely grip the cable when the ball pieces are assembled together and machine screws 26 are tightened in nuts 28, received in hexagonal recesses 30 aligned with screw holes 32.

A clearance recess for the cable 12 is provided by outside shallow and wide grooves 34A, 34B and a narrower, deeper central groove 36 in each ball piece 20A, 20B, accommodate the portions of the cable 12 which extend within ball stop 18 outside of the insert grooves 24A, 24B.

Referring to FIGS. 3–5, the ball stop is also able to be securely fit to a hoist chain 38.

For this application, the cable clamping inserts 22A, 22B are removed as indicated in FIG. 3. The center groove 36 is continued across insert grooves 21A, 21B into wider shallower clearance grooves 34A, 34B, forming deeper pockets 40A, 40B.

The total length, depth and width of groove 36 and aligned pockets 40A, 40B are selected to allow a chain link 38A to be pressed therein edgewise as shown in FIG. 4, with half received in each of the ball pieces 20A, 20B when they are assembled together.

The depth of clearance grooves 34A, 34B are selected to be one half the thickness of the chain links and of the same width, so that connected links 38B, 38C can be accommodated when laid flat therein. The inner ends are fit to curved corners 42, and protrude out from the assembled ball pieces 20A, 20B.

Additional full depth pockets 44A, 44B located at the outer end of recesses 34A, 34B accommodate the inner ends of links 38D, 38E so as to allow relative inclination thereof.

Thus, with only the use of an Allen wrench for the machine screws 26, the stop ball 18 can be readily and securely attached to either a cable or chain.

I claim:

1. A stop element adapted to be secured to a cable, comprising:

a pair of stop element component pieces configured to be assembled together, each of said pieces having a face abutting a corresponding face on the other component piece, with a clearance recess extending completely across the abutting face of each of said component pieces, each said clearance recess aligned with each other with said component piece faces in abutment to allow a cable to extend through said stop element;

at least one elongated transverse recess formed into each said abutting face extending transversely to said clearance recess and a cable disposed therein;

a pair of respective elongate inserts of harder material than said component pieces, each of said inserts tightly fits into a respective said transverse recess to place a surface thereof against a surface of the other respective insert;

each of said inserts having a groove formed across said surface thereof, said groove of each of said inserts aligned with each other when said component pieces are assembled together to encircle a cable, said grooves extending to be aligned with said clearance recess and shaped to grip a cable when assembled to secure a cable to said element; and means for drawing said stop element pieces together to hold said faces of said component pieces abutting together and said surfaces of said inserts against each other.

2. The stop element according to claim 1 wherein a second transverse recess is formed into each of said abutting faces of each of said element pieces, spaced from said first mentioned recess, the second pair of elongate inserts, each tightly fits into a respective second recess, each of said second inserts formed with a groove aligned with said groove of said first mentioned inserts, said grooves located and shaped to encircle and grip a cable at spaced locations.

3. The stop element according to claim 2 wherein said stop element is constructed of plastic and said inserts are constructed of steel.

4. The stop element according to claim 1 wherein said stop element is ball shaped, each of said component pieces thereof being hemispherical.

5. The stop element according to claim 2 wherein each of said clearance recesses includes shallow, wide grooves formed on either side of said respective transverse recess having said insert fit therein to accommodate a cable when said stop element component piece faces are held in abutment.

6. The stop element according to claim 1 wherein a plurality of screws extend through said stop element pieces, engaging respective nuts to enable said stop element pieces to be drawn together.

7. The stop element according to claim 1 wherein said clearance recess includes a deep elongated central groove formed into said face of each of said component pieces, extending transversely to said transverse recess and configured to receive a chain link edgewise whereby upon removal of said inserts a chain link can be engaged to be held by said stop element component pieces.

8. The stop element according to claim 7, said clearance recess further including shallow, wide clearance grooves formed into said face of each of said stop element component pieces on each end of said central elongated deep groove, each configured to enclose a chain link turned flat on each end of said chain link fit edgewise into said central groove.

9. The stop element according to claim 8 further including a pair of pockets formed into said face of each of said stop element component pieces on the outside of said shallow, wide clearance grooves, adapted to accommodate end portions of an additional chain link on an outside end of each chain link turned flat.

* * * * *

UNITED STATES PATENT AND TRADEMARK OFFICE
CERTIFICATE OF CORRECTION

PATENT NO.   : 5,644,821
DATED        : July 8, 1997
INVENTOR(S)  : James Zaguroli, Jr.

It is certified that error appears in the above-indentified patent and that said Letters Patent is hereby corrected as shown below:

Column 2, line 29, "accommodate" should be --accommodating--.

Column 3, line 6, "a respective said transverse recess" should be --said respective recess transverse recess--.

Signed and Sealed this

Sixteenth Day of September, 1997

Attest:

BRUCE LEHMAN

Attesting Officer

Commissioner of Patents and Trademarks